Sept. 16, 1952 P. J. CADE ET AL 2,611,113
ELECTROLYTE INDICATING AND CONTROL APPARATUS
Filed Feb. 2, 1951

INVENTORS: P. J. CADE
D. J. MACDOUGALL
BY
ATTORNEY

Patented Sept. 16, 1952

2,611,113

UNITED STATES PATENT OFFICE 2,611,113

ELECTROLYTE INDICATING AND CONTROL APPARATUS

Phillip J. Cade, Winchester, and Donald J. MacDougall, Framingham, Mass., assignors to Photoswitch Marine Division, Inc., New York, N. Y., a corporation of New York Application February 2, 1951, Serial No. 209,157

7 Claims. (Cl. 315—274)

This invention relates to improvements in fluid testing apparatus and, in particular, to apparatus for visually indicating and electrically controlling the electrolyte concentration of liquids. Apparatus of this type is commonly utilized for obtaining quantitative visual indications of the presence of sea salt in marine power and distilling plants and for effectuating certain necessary steps in plant operation when the salinity of the water utilized therein exceeds a maximum allowable value.

The salinity indicating and control apparatus of this invention of necessity cooperates with many of the different types of electrolyte conductivity cells of the prior art to attain the objects hereinafter set forth. Basically, these cells usually comprise two electrodes whose spacing and liquid contact area are accurately fixed. When one of these cells is immersed in the liquid to be tested and connected to auxiliary apparatus, the electrical impedance of the liquid volume between the electrodes can be determined. Since the impedance of the saline solution varies inversely to the concentration of the electrolyte, continual or periodic electrical conductivity testing of the portion of the liquid sampled by a set of these cell electrodes will disclose minute changes in the salinity of the liquid. These electrical conductivity values are easily converted to equivalent concentrations of sea salt by a properly calibrated metering circuit.

Unfortunately, the impedance of a saline solution is affected not only by the electrolyte concentration thereof, but also by the temperature of the liquid. Temperature-compensating conductivity cells have, therefore, been utilized in the prior art to compensate for the inaccuracies in salinity measurements introduced by changes in the temperature of the liquid tested. These cells usually comprise, in addition to the electrodes of the basic cell, a temperature-compensating impedance element having substantially the same temperature coefficient of impedance as the saline solution tested. The complete temperature-compensating conductivity cell thus comprises two impedance elements, that is, the temperature-compensating element and the volume of the saline solution between the cell electrodes. When these two impedance elements are properly connected to auxiliary circuits and subjected to the same temperature changes, any variations in the conductivity of the solution tested caused by temperature changes will be automatically compensated for, so that a correct indication and control operation influenced only by salt concentration can be obtained.

Less sophisticated temperature-compensating arrangements utilize the basic cell, hereinbefore described, together with a manually operated rheostat whose movable contact arm positions are calibrated in terms of temperature readings. If the temperature of the saline solution tested is known, a manual operation of the rheostat to the proper temperature-compensating position will correct inaccuracies in the concentration readings introduced by ambient temperature changes in the liquid tested. This arrangement, therefore, requires means for continually monitoring the temperature of the liquid tested, as well as a manual operation of the temperature-compensating rheostat in accordance with the reading of the temperature-determining means.

In salinity indicating arrangements of the prior art, it has been customary to connect fairly complex auxiliary apparatus to the aforementioned automatic temperature-compensating conductivity cells to actuate a meter which is calibrated to read in terms of concentration of sea salt. The apparatus to initiate the operation of a control device when said salinity reading exceeds a maximum value is likewise complex in structure.

In the salinity indicating arrangements of the prior art which cooperate with the basic conductivity cell and the manually operated temperature-compensating rheostat, a meter having a set of rotor coils secured together in quadrature and freely movable in a magnetic field have been connected to the basic cell and the compensating rheostat to visually indicate the salinity of the solution tested. This apparatus, although simple in structure, requires a proper manual positioning of the temperature-compensating rheostat before a correct concentration reading can be made. Moreover, the concentration control apparatus can function properly only during the times at which the temperature-compensating rheostat is properly positioned. Therefore, if the temperature of the liquid tested changes and the rheostat has not been adjusted to compensate for the change, the control apparatus will produce an inaccurate control function.

Accordingly, it is an object of this invention to provide automatic and continuous salinity measurements which are not affected by ambient temperature changes in the liquid tested.

Another object of this invention is to provide automatic and continuous control of a liquid system responsive only to the salinity concentration thereof.

Another object of this invention is to improve the operative accuracy and sensitivity of salinity indicating and control apparatus.

The novel structure for attaining these objects cooperates with the automatic temperature-compensating conductivity cell hereinbefore described. One of these conductivity cells is connected to the apparatus of this invention, thereby measuring the electrical conductivity of the liquid tested. These electrical conductivity values are converted to equivalent concentrations of sea salt by a calibrated meter which comprises a special power factor type instrument including a stator field coil and a movable pair of rigidly coupled rotor coils. The rotor coils of the meter are connected directly to the two impedance elements of the conductivity cell in a novel bridge arrangement, whereby the resultant magnetic field of the two rotor coils produces a meter deflection which is not influenced by the ambient temperature of the liquid tested. One branch of the bridge includes the impedance of a sample of the liquid under test connected in series with a rotor coil of the meter, and the other branch of the bridge includes the temperature-compensating impedance element of the conductivity cell connected in series with the second rotor coil of the meter. Both rotor coils and the meter pointer are in a fixed relationship with respect to one another and the combination thereof is movable in a magnetic field produced by the meter stator coil, whereby the various current amplitudes in the two rotor coils produce a meter deflection which may be calibrated in terms of sea salt concentrations. This deflection is independent of the ambient temperature of the liquid tested because variations therein also affect the impedance of the temperature-compensating element of the conductivity cell so that the ratio of the currents in both rotor coils remains constant, thereby producing no change in the vector angle of the resultant magnetic field of the rotor coils.

The novel control circuit of a preferred embodiment of this invention connects directly to the aforementioned meter rotor coils so that a breakdown potential is applied to the control space path of a thyratron gas tube whenever the salinity of the solution tested exceeds a value determined by the position of a movable contact arm on a rheostat calibrated in terms of salinity concentrations. The breakdown of the aforementioned thyratron, when the salinity concentration exceeds the limit prescribed by the rheostat position, actuates an output or control device so that any desired system changes may be effected in direct response to the excessive salinity concentration.

In order that the mode of operation of the novel structure of this invention may be readily understood, reference is herein made to the drawings, wherein.

Figure 1:
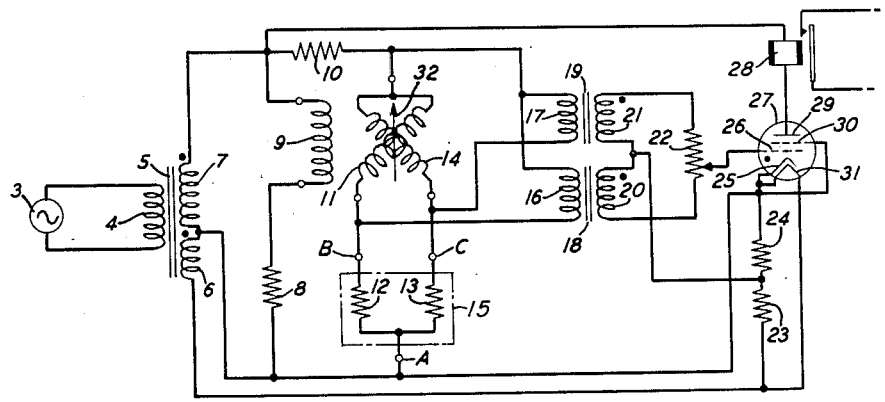
Fig. 1 is a schematic diagram of the indicating and control circuit of this invention.

Referring now to Fig. 1, transformer 5 comprises a single primary winding 4 and two secondary windings 6 and 7. The dots associated with one terminal of most of the transformer windings of the circuit indicate that the potentials thereof when measured in the direction of the dotted terminal are in phase with one another. Secondary windings 6 and 7 are, therefore, connected in a series aiding potential relationship with respect to one another. In a preferred embodiment of this invention, secondary winding 7 has an output potential of approximately 110 volts, whereas secondary winding 6 has an output potential of approximately 6 volts.

Stator field coil 9 and rotor field coils 11 and 14, together with pointer 32, comprise a special type power factor meter. Rotor coils 11 and 14 are mechanically fixed to one another preferably in quadrature and the combination thereof is rigidly fixed to meter pointer 32. When current flows through one or both of the rotor coils, the combination thereof rotates, thereby deflecting the associated meter pointer until the vector angle of the resultant magnetic field of the rotor coils is parallel to the field of stator coil 9.

Figure 2:
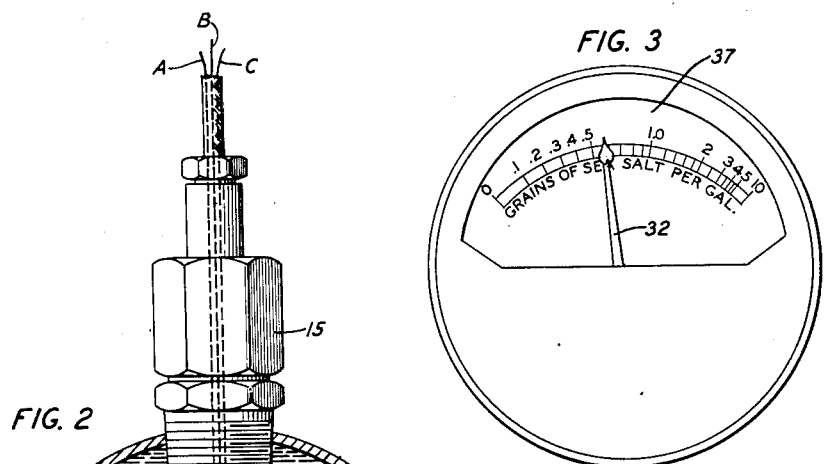
Fig. 2 is a simplified front elevation, partly in section, of an automatic temperature-compensating conductivity cell suitable for use in the circuit of Fig. 1. This cell is coupled to a pipe section containing a saline solution whose concentration is to be tested and controlled.

Impedance elements 12 and 13 within enclosure 15 comprise a schematic representation of the automatic temperature-compensating conductivity cell 15 of Fig. 2. Impedance element 13 comprises in actuality the saline liquid volume between electrodes 33 and 34 of cell 15 shown in Fig. 2, whereas impedance element 12 comprises in actuality the solid disc-shaped resistor 12 of Fig. 2. This resistor has the same negative temperature coefficient of resistance as the liquid tested. Conductors A, B and C of cell 15 of Fig. 2 connect directly to the corresponding terminals shown in Fig. 1. In Fig. 2, conductor A connects to metallic container electrode 34. The inner surface of electrode 34 makes electrical contact with the lower surface of disc resistor 12. During liquid testing the outer surface of electrode 34 is wetted by the liquid within pipe 37. This liquid flows through side apertures 35 and the bottom opening 36 of electrode 33. Conductor B is connected directly to the top surface of the resistor 12. Conductor C is connected directly to metallic electrode 33. A more detailed disclosure of the novel temperature-compensating conductivity cell 15 of Fig. 2 may be found in the application of P. J. Cade and B. E. Shaw, Serial No. 209,158, filed February 2, 1951.

The alternating-current potential of secondary winding 7 is applied through limiting resistor 10 to the two parallel connected branches which comprise rotor coil 11 and impedance element 12, and rotor coil 14 and impedance element 13. Stator coil 9 is energized by current flowing from secondary winding 7 through limiting resistor 8.

The primary winding 16 of transformer 18 is connected directly to the terminals of rotor coil 11, whereas the primary winding 17 of transformer 19 is connected directly to rotor coil 14. The secondary windings 20 and 21 of transformers 18 and 19, respectively, are connected in a series aiding potential relationship with respect to one another. Rheostat 22 is connected between the upper terminal of winding 21 and the lower terminal of winding 20. The variable resistance tap of rheostat 22 is connected directly to control grid 26 of thyratron type gas tube 27.

Secondary winding 6 is connected directly to serially connected resistors 23 and 24 and shunting filament 31. Grid 30 and cathode 25 are connected directly to the upper terminal of resistor 24. The junction terminal between resistors 23 and 24 is connected directly to the junction terminal between secondary windings 20 and 21. Secondary winding 7 is connected to the anode 29-cathode 25 space path of tube 27 through relay winding 28. A single make contact is actuated when relay winding 28 is energized.

The operation of the circuit of Fig. 1 is as follows: With alternating current source 3 energizing primary winding 4, the potential from secondary winding 7 energizes stator field coil 9 by current flow through resistor 8. Current flow through coil 9 produces a magnetic field which envelopes rotor coils 11 and 14.

Rotor coil 11 is energized by current flowing from secondary winding 7 in a path which comprises limiting resistor 10, rotor coil 11 and temperature-compensating impedance element 12. Rotor coil 14 is energized by current flow from secondary winding 7 in a path which comprises limiting resistor 10, rotor coil 14 and impedance element 13, which element is in actuality the impedance of the liquid sampled between electrodes 33 and 34.

Current flow in one or both of rotor coils 11 and 14 produces a magnetic field which interacts with the enveloping magnetic field of stator coil 9, thereby producing a mechanical rotation of the rotor coils and a consequent pointer 32 deflection until the vector angle of the resultant magnetic field of both rotor coils is parallel to the field of the stator coil. For example, consider the following two cases. If rotor coil 11 is energized and rotor coil 14 is unenergized, the movable rotor coil combination including pointer 32 will rotate counterclockwise until coil 11 assumes a vertical position. With this positioning, the resultant magnetic field produced by both rotor coils is parallel to to the magnetic field of the stator coil. The case just described is one wherein the salinity of the liquid tested is zero, for when no current flows through rotor coil 14, the impedance of element 13 is infinite. In the second case, if the current flowing through rotor coil 14 is greatly in excess of the current flowing through rotor coil 11, the movable rotor coil combination including pointer 32 will rotate clockwise until coil 14 assumes a substantially vertical position. With this positioning, the resultant magnetic field produced by both rotor coils is parallel to the magnetic field of the stator coil. This second case is one wherein the salinity concentration of the liquid tested is high, for when the current through rotor coil 14 is greatly in excess of the current through rotor coil 11, the impedance of element 13 is very low. It is to be again noted that the impedance of element 13 is in actuality the impedance of the liquid sampled between electrodes 33 and 34.

Figure 3:
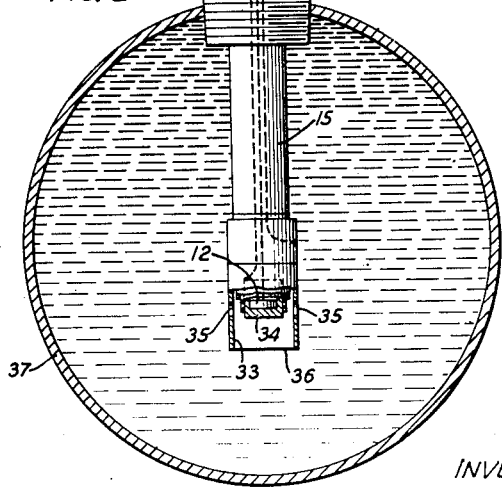
Fig. 3 is a view, in front elevation, of the indicating meter used in the circuit of Fig. 1.

Inasmuch as both rotor coils are mechanically coupled in quadrature, pointer 32 can traverse a maximum angle of 90 degrees. When the positioning of the pointer coincides with the left leg of the angle, a salinity of zero will be indicated. When the positioning of the pointer coincides with the right leg of the angle, a maximum salinity reading will be indicated. In Fig. 3, pointer 32 is shown giving a random reading on a scale 37, which scale is arbitrarily calibrated in terms of grains of sea salt per gallon. The scale shown was calibrated for the case wherein automatic temperature-compensating element 12 has an impedance value of approximately seventy per cent of the impedance of the liquid sampled between electrodes 33 and 34 when said liquid has a salinity concentration of one grain of sea salt per gallon. Different resistance values for compensating resistor 12, with respect to the impedance of a given salinity concentration of the liquid under test, will, of course, change the distribution of the value markings on scale 37.

As the salinity concentration of the liquid under test varies from a zero concentration to a maximum concentration, the current through rotor coil 14 increases in response thereto, whereas the current through rotor coil 11 remains constant because resistor 12 maintains a fixed impedance value for a constant temperature. This range of current variation through rotor coil 14 produces a substantially 90 degree clockwise angular rotation of the rotor coils and pointer 32 because of the requirement that the stator coil magnetic field and the resultant magnetic field of the rotor coils be parallel to one another. The different degrees of angular rotation are easily converted into concentrations of sea salt by a calibrated scale identical or similar to scale 37.

The indications of the metering circuit are not affected by temperature changes in the liquid tested because the ratio of the impedance of temperature-compensating resistor 12 to the impedance of the liquid tested remains constant. The ratio of the current variations in both rotor coils in response to temperature changes in the liquid tested is, therefore, constant in value and does not alter the vector angle of the resultant magnetic field of the rotor coils. Likewise, the meter indications are independent of supply voltage variations applied by winding 7 because these variations do not affect the ratio of the rotor coil currents. Moreover, inasmuch as all of the meter coils have an air core, the meter indications are also independent of reasonable frequency variations in the alternating-current potential applied by secondary winding 7.

The detailed operation of the control circuit of this invention is as follows: the potential developed across secondary winding 21 is directly proportional and responsive to changes in the potential applied to rotor coil 14, inasmuch as primary winding 17 directly shunts rotor coil 14. Likewise, the potential developed across secondary winding 20 is directly proportional and responsive to changes in the potential applied to rotor coil 11, inasmuch as primary winding 16 directly shunts rotor coil 11. Secondary windings 20 and 21 are connected in a series aiding potential relationship with respect to one another so that the potential applied to rheostat 22 at any given time is proportional and responsive to the sum of the potentials applied to rotor coils 11 and 14.

Control grid 26 of gas tube 27 assumes a potential determined by the position of the variable tap of rheostat 22. Tube 27 is prevented from breaking down by a biasing potential developed across resistor 24 by secondary winding 6. The magnitude of this biasing potential is determined by the value of resistor 24 as compared to the total resistance value of resistors 23 and 24. This biasing potential drives control grid 26 in a negative direction with respect to cathode 25, when a positive potential is applied to anode 29 with respect to cathode 25 through relay winding 28 from secondary winding 7.

The biasing potential is applied to the control grid 26-cathode 25 space path in series with the potential between the junction terminal of secondary windings 20 and 21 and the movable tap of rheostat 22. If the movable tap of rheostat 22 is moved sufficiently upwards, the bias is overcome and tube 27 is broken down. The amount which the movable tap must be moved upwards to initiate breakdown depends, of course, upon several factors which include the amplitude of the potentials developed across windings 20 and 21, the amplitude of the biasing potential across resistor 24, and the amplitude of the potential applied to anode 29.

If the salinity concentration of the liquid under test varies from a zero value to a high value, assuming a fixed temperature, the potential across winding 21 will likewise increase from zero to a high value. The potential applied to rheostat 22 will, therefore, vary from the constant potential applied by winding 20 to a new value which includes the high potential value applied by winding 21.

This potential variation across rheostat 22 makes possible a calibration of the various positions of the movable tap in terms of the salinity concentration of the liquid under test. That is, the variable tap can be adjusted so as to break down tube 27 whenever the salinity concentration of the liquid under test exceeds a limit or value determined by the position of the tap. For example, if it is desired to break down tube 27 in response to a low value of salinity concentration, the variable tap, in general, must contact the upper portions of rheostat 22 to obtain sufficient potential to oppose the biasing potential and thereby initiate breakdown. If, however, it is desired to break down tube 27 only in response to a high value of salinity concentration, the variable tap must contact the lower portions of rheostat 22. Thus, a predetermined setting of the movable tap will break down tube 27 whenever the salinity concentration of the liquid under test exceeds the desired value.

Breakdown of tube 27 will cause a current to flow through winding 28 of sufficient magnitude to close the associated relay make contact. This contact closure can be utilized to operate any conventional apparatus to promote the necessary system changes whenever the system salinity exceeds the desired value. For example, relay 28 can be utilized to actuate conventional liquid dumping apparatus.

For a given automatic temperature-compensating conductivity cell, the ratio of the currents through rotor coils 11 and 14 will be a constant value which is affected only by the electrolyte concentration of the liquid under test. The ratio of the potentials across secondary windings 20 and 21 is, therefore, the same as the ratio of the currents through the rotor coils 11 and 14, respectively.

If resistors 23 and 24 are selected so that tube 27 will break down when a zero potential difference exists between the junction of secondary windings 20 and 21 and the movable tap of rheostat 22, the control circuit will respond only to changes in the electrolyte concentration of the liquid under test. To attain this potential requirement, the ratio of the potential developed across the portion of rheostat 22 above the movable tap to the potential developed across the portion below the movable tap must be equal to the ratio of the potentials across secondary windings 20 and 21, respectively. With the movable tap of rheostat 22 adjusted to attain this potential distribtuion and as the electrolyte concentration of the liquid under test approaches closely the maximum value specified by the positioning of the movable tap, any changes in the ambient temperature of the liquid will not affect the potential applied to the control space path of tube 27. If the electrolyte concentration exceeds the value specified, a positive potential is added to the negative bias across resistor 24, thereby causing tube 27 to break down. If the electrolyte concentration is less than the specified value, a negative potential will be added to the biasing potential across resistor 24. This potential will remain negative regardless of the ambient temperature of the liquid under test. Under these conditions tube 27 is operable only in response to variations in the salinity concentration under test and only when the salinity concentration exceeds the value specified by the rheostat adjustment.

It is to be understood that the above-described arrangements are illustrative of the applications of the principles of this invention. Numerous other arrangements may be devised by those skilled in the art without departing from the scope of the invention.

What is claimed is:

1. Apparatus responsive to changes in liquid electrolyte concentration, comprising a temperature-compensating conductivity cell including a compensating impedance element and a pair of basic electrodes, an alternating-current potential source, a first impedance element and a second impedance element, said basic electrodes being connected to said alternating-current potential source through said first impedance element, said compensating impedance element being connected to said alternating-current potential source through said second impedance element, a plurality of transformers each having primary and secondary windings, said primary windings being connected to said first and second impedance elements and said secondary windings being connected to one another so that the total potential across said secondary windings is responsive to the sum of the potentials across said first and second impedance elements, a third impedance element including an adjustable tap thereon connected across said secondary windings, and a gaseous discharge tube including a control space path and a main space path, said control space path being connected to said adjustable tap and the junction of said secondary windings whereby a predetermined positioning of said adjustable tap will break down said main space path when said basic electrodes are immersed in a liquid having an excessive electrolyte concentration.

2. Apparatus responsive to changes in liquid electrolyte concentration, comprising a temperature-compensating conductivity cell including a compensating impedance element and a pair of basic electrodes, an alternating-current potential source, a meter including a pair of rotor coils angularly disposed with respect to one another and a stator coil, said basic electrodes being connected to said alternating-current potential source through one of said rotor coils, said compensating impedance element being connected to said alternating-current potential source through the other of said rotor coils, a plurality of transformers each having primary and secondary windings, each of said primary windings individually shunting one of said rotor coils, each of said secondary windings being connected in a series-aiding potential relationship with respect to one another, an impedance element including an adjustable tap thereon connected directly across said secondary windings, an electron discharge tube including a control space path and a main space path, said control space path being connected between said secondary windings and said adjustable tap whereby a predetermined positioning of said adjustable tap will break down said main space path when said basic electrodes are immersed in a liquid having an excessive electrolyte concentration.

3. Apparatus responsive to changes in liquid electrolyte concentration, comprising a temperature-compensating conductivity cell including a temperature-compensating element and a pair of basic electrodes, an alternating-current potential source, a meter including a pair of rotor coils angularly disposed with respect to one another, said basic electrodes being connected to said alternating-current potential source through one of said rotor coils, said compensating element being connected to said alternating-current potential source through the other of said rotor coils, means connected to both of said rotor coils for developing a potential proportional to the total potential drop across said rotor coils, an impedance element including a tap thereon, and a gaseous space path connected to said means through said impedance element whereby breakdown of said space path will occur in response to the immersion of said basic electrodes in a liquid of excess electrolyte concentration.

4. Apparatus for rendering an output response to an excess liquid electrolyte concentration as measured by an automatic temperature-compensating conductivity cell having a pair of basic electrodes and a compensating element, comprising means for generating a potential whose amplitude is proportional to the amplitude of the current flow through said basic electrodes, means for generating a potential whose amplitude is proportional to the amplitude of the current flow through said compensating element, an impedance element having an intermediate potential tap thereon, both of said potential generating means being connected in a series-aiding potential relationship with respect to one another and said impedance element being connected across said series combination whereby a bridge circuit is formed, output means including an input circuit, said input circuit being connected between the tap of said impedance element and the junction connection of both of said potential means, a potential source for biasing said output means so that an output response will be rendered thereby whenever a potential substantially equal to zero is applied to said input circuit by said bridge circuit.

5. Apparatus for rendering an output response to an excess liquid electrolyte concentration as measured by an automatic temperature-compensating conductivity cell having a pair of basic electrodes and a compensating element, comprising means for generating a potential whose amplitude is proportional to the amplitude of the current flow through said basic electrodes, means for generating a potential whose amplitude is proportional to the amplitude of the current flow through said compensating element, an impedance element having an intermediate potential tap thereon, both of said potential generating means being connected in a series-aiding potential relationship with respect to one another and said impedance element being connected across said series combination whereby a bridge circuit is formed, output means operable when a substantially zero or greater input potential is applied thereto, said output means being connected between the tap of said impedance element and the junction connection of both of said potential means, whereby the requisite operating potential is applied to said output means in response to the measuring of at least a specified electrolyte concentration whose value is determined by the relative position of said tap with respect to said impedance element.

6. Apparatus for rendering an output response to an excess liquid electrolyte concentration as measured by an automatic temperature-compensating conductivity cell having a pair of basic electrodes and a compensating element, comprising means for generating two series-aiding potentials whose potential ratio is equal to the ratio of the current flowing through said compensating element and the current flowing between said basic electrodes during liquid testing, an impedance element having an intermediate potential tap thereon, said element being connected directly across said generating means whereby a bridge circuit is formed, output means operable when a substantially zero or greater input potential is applied thereto, said output means being connected between the tap of said impedance element and a junction connection for said two series-aiding potentials whereby the requisite operating potential is applied to said output means in response to the measuring of at least a specified electrolyte concentration whose minimum value is determined by the relative position of said tap with respect to said impedance element.

7. Apparatus for rendering an output response to an excess liquid electrolyte concentration as measured by an automatic temperature-compensating conductivity cell having a pair of basic electrodes and a compensating element, comprising means for generating two series-aiding potentials whose potential ratio is equal to the ratio of the current flowing through said compensating element and the current flowing between said basic electrodes during liquid testing, an impedance element having an intermediate potential tap thereon, said element being connected directly across said generating means whereby a bridge circuit is formed, output means operable when a specified input potential is applied thereto, said output means being connected between the tap of said impedance element and a junction connection for said two series-aiding potentials whereby the requisite specified operating potential is applied to said output means in response to the measuring of at least a specified electrolyte concentration whose minimum value causes the ratio of the potentials across the two divided portions of said impedance element to equal the ratio of the two potentials of said generating means.

PHILLIP J. CADE.
DONALD J. MacDOUGALL.

REFERENCES CITED

The following references are of record in the file of this patent:

UNITED STATES PATENTS

| Number | Name | Date |
| --- | --- | --- |
| 1,450,023 | Edelman | Mar. 27, 1923 |
| 1,912,188 | Gann | May 30, 1933 |
| 1,990,366 | Bivens | Feb. 5, 1935 |
| 2,117,670 | Ketay et al. | May 17, 1938 |
| 2,215,313 | Alexanderson | Sept. 17, 1940 |
| 2,306,691 | Ellis | Dec. 29, 1942 |
| 2,422,873 | Wolfner | June 24, 1947 |

OTHER REFERENCES

The Electrochemical Society, Preprint 73-25, pages 353-365, article by Parent et al.